March 2, 1943. W. TRAUTNER 2,312,454
LAMP MOUNTING AND ASSEMBLY
Filed Sept. 3, 1940
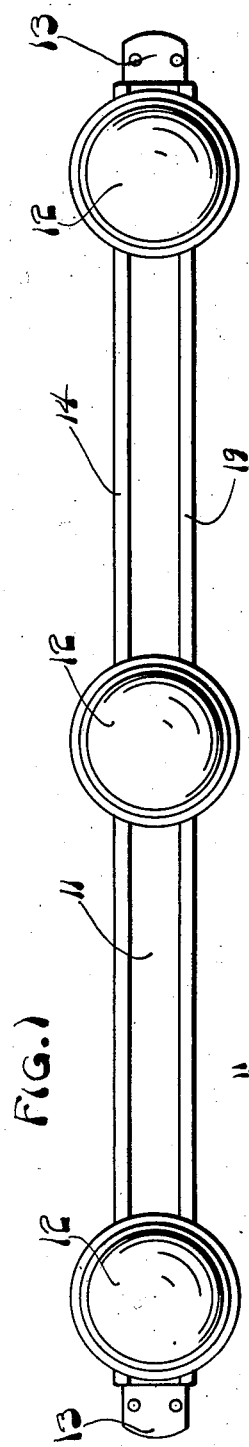
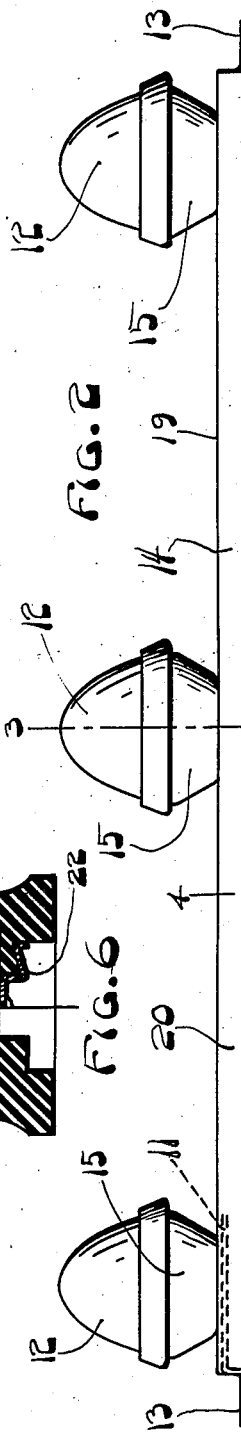
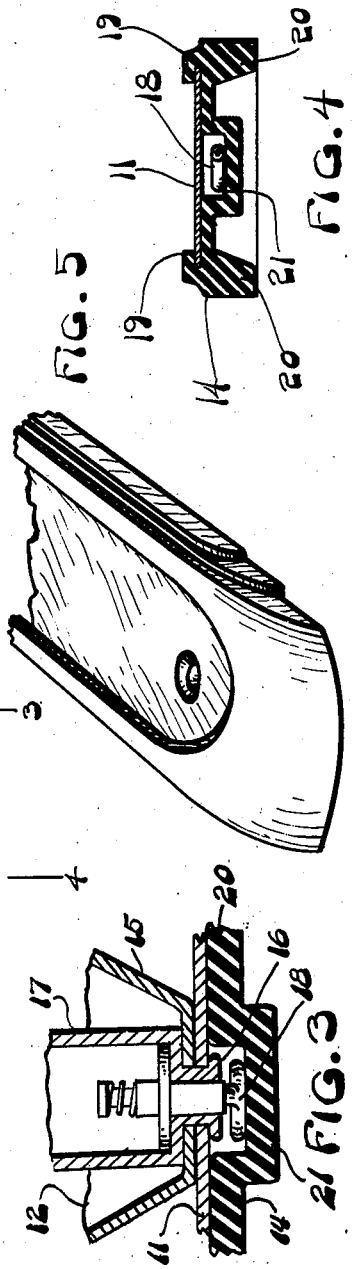
INVENTOR.
Wagn Trautner
BY Bogert & Bogert
ATTORNEYS

UNITED STATES PATENT OFFICE 2,312,454

LAMP MOUNTING AND ASSEMBLY

Wagn Trautner, Springdale, Ohio, assignor to The K-D Lamp Company, Cincinnati, Ohio, a corporation of Ohio Application September 3, 1940, Serial No. 355,205

3 Claims. (Cl. 177—329)

This invention relates to the type of lamp equipment with which automobile trucks, buses, taxicabs and similar automotive vehicles frequently are equipped for illumination at their roofs. The usual lamp equipment of this type consists of a series of small lamps mounted in spaced relationship near the forward and/or rear edge of the roof. Since roof contours of automotive vehicles usually are curvilinear and since this thereby necessitates either separate mounting of each lamp or of providing some mounting structure especially designed for the curvature, with usual multiplicity of holes through the roof for lamp stems, bolts, screws, electric wiring, etc., I have devised the structure herein described, in which an object is to produce a lamp mounting and assembly by means of which a series of lamps are mounted rigidly and fixedly relatively to each other, but in which adaptability of mounting to either planar and curvilinear surfaces with equal feasibility is attained through an unique structural provision whereby flexibility is obtained with accompanying and improved sealing qualities as to the roof mounting and with accompanying and improved insulating qualities as to the electric circuit, its connections and its contacts.

In the drawing accompanying the following specification, Fig. 1 is a plan view of a mounting device and lamp assembly embodying a preferred form of my invention.

Fig. 2 is a side elevation of structure disclosed in Fig. 1.

Fig. 3 is an enlarged fragmentary sectional view disclosing structural details along the line 3—3 of Fig. 2.

Fig. 4 is a view similar to Fig. 3, but as taken on the line 4—4 of Fig. 2.

Fig. 5 is a fragmental perspective view of a modified form of my invention, the details of which will be described.

Fig. 6 shows in one view details of another modified form of my invention, constituting a composite view, as will be described.

The principal element of the group comprising the novel construction I now describe, is a metal strip 11 upon which the lamps 12 which are to be grouped, are held, as will be described, the ends of the strip being turned downwardly and apertured to form fastening lugs 13 through which bolts, screws and the like may be passed for attaching the assembly to the roof or other part of a vehicle body, while a socket-like pad or sealing element 14, of rubber or similar material, is provided as a cooperating part of the ensemble, for purposes which will be described.

The manner of fastening the lamps 12 to the strip 11 may be somewhat as shown in Fig. 3, in which the body 15 of the lamp is centrally apertured at its base to pass the tubed or eyeletted end 16 of the bulb mounting connector tube 17 of the lamp, and in which, as shown in Fig. 3, the strip 11, body 15, and connector 17 are held together, with a central passage for wires or other electrical connections 18 to extend to the opposite side of strip 11. The rubber pad or socket 14 is shaped with a preferred longitudinal overlying lip 19 gripping the strip on each side, while base edges 20 of the socket extend below the hollow central portion of the socket, in which central portion a chanel 21 is formed for the reception of the wires or other connections to the lamps 12, as shown in Figs. 3 and 4.

In Figs. 1 and 2 the end treatment of the metal strip discloses the rubber lips 19 terminating at the ends while the ends of strip 11 are bent down to form lugs 13, as has been described. However, this may be varied, as shown in Fig. 5, to inclose the ends of the strip within an appropriately designed molded formation of the rubber as suggested. In Fig. 6 the thought of variation of forming the rubber socket is advanced to the simplification of providing merely a strip of rubber along each side of the metal strip and of clipping this strip at intervals to the lamp mounting metal strip 11 by metal clips or clamps 22. This disclosure of the modification just described shows the ensemble as it would appear in the region of the unclamped rubber and in the region of the clamped rubber, the left and right halves of the view showing these respective regions. It is to be noted that in this modification no central wire carrying channel has been provided.

Obviously, in any of the suggested forms of the invention I have shown, it is but necessary to bend the entire structure at the time the mounting screws, bolts, or other fasteners at the ends of the ensemble are drawn tight. This act forces the strip 11 and the socket 14 to yield to the conformation of the roof or body surface and also forces the rubber of the socket to seal the space beneath the strip 11 so that moisture and dirt is excluded from the electrical connections to the lamps. Obviously, since the ensemble is thus inclosed in a neat and flexible structure, necessity of providing more than one opening for electrical connections is eliminated and the several openings required for several lamp mountings also are eliminated.

Having thus described my invention what I claim is:

1. A lamp mounting consisting of a flexible flat metal strip having a lamp housing attached thereto, a rubber strip having an open wire-receiving channel in one face and lips at the edges thereof gripping the edges of the metal strip, whereby the channel is closed by the metal strip and the rubber strip rendered coflexible with the metal strip, and means adapted to hold the opposite face of the strip in sealing conformation with a surface to receive the strip.

2. A lamp assembly and mounting device consisting of a flat and flexible metal strip, a series of lamp housings containing electrical illumination means attached to and extending from one face of said flat metal strip, in spaced relation to each other, the illumination means having their electrical connections extending through said strip to the opposite side thereof, a flat and flexible resilient sealing strip having a surface to receive said metal strip, this surface having lips bordering the edges of the resilient strip and gripping the metal strip around its edges, said lip-bordered surface of the resilient strip having a channel therein to receive said electrical connections, and means adapting the united strips to be fastened in conformation to a surface to receive the device thus permitting flexure of the joined strips normal to the plane of their flatness.

3. A lamp assembly and mounting device consisting of a metal strip having a flat central portion terminating at its ends in fastening lugs, a series of lamps attached to and extending from one face of said flat central portion, and having their electrical connections extending through said strip to the opposite side thereof, a flat and flexible resilient sealing strip located between the lugs, supporting on one face the central portion of the metal strip and having lips bordering its own edges and gripping the edges of the metal strip, the opposite face of the resilient strip with the lugs of the metal strip supporting the device in conformation to and in sealing engagement with a surface mounting the device, said resilient strip having a channel therein adjacent to the metal strip, whereby said electrical connections will be received therein.

WAGN TRAUTNER.